(12) United States Patent
Yang et al.

(10) Patent No.: US 8,464,676 B2
(45) Date of Patent: Jun. 18, 2013

(54) VARIABLE VALVE TIMING APPARATUS

(75) Inventors: Jei Choon Yang, Yongin-si (KR); Byong Young Choi, Incheon (KR); Jin Kook Kong, Suwon-si (KR); Soo Hyung Woo, Yongin-si (KR); Jin Soon Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 125 days.

(21) Appl. No.: 13/231,401

(22) Filed: Sep. 13, 2011

(65) Prior Publication Data
US 2012/0137996 A1 Jun. 7, 2012

(30) Foreign Application Priority Data

Dec. 6, 2010 (KR) .......................... 10-2010-0123453

(51) Int. Cl.
*F01L 1/34* (2006.01)
(52) U.S. Cl.
USPC ....................................................... 123/90.17
(58) Field of Classification Search
USPC .......................................... 123/90.17, 90.15
See application file for complete search history.

(56) References Cited

U.S. PATENT DOCUMENTS

| 6,457,446 | B1 * | 10/2002 | Willmot | 123/90.17 |
| 7,475,661 | B2 * | 1/2009 | Taye et al. | 123/90.17 |
| 2010/0313836 | A1 | 12/2010 | Kameda et al. | |
| 2011/0308488 | A1 * | 12/2011 | Kong et al. | 123/90.17 |

FOREIGN PATENT DOCUMENTS

| JP | 2007-100681 A | 4/2007 |
| JP | 3937164 B2 | 4/2007 |

* cited by examiner

*Primary Examiner* — Thomas Denion
*Assistant Examiner* — Ngoc T Nguyen
(74) *Attorney, Agent, or Firm* — Morgan, Lewis & Bockius LLP

(57) ABSTRACT

A variable valve timing apparatus according to the present invention may include a camshaft holder connected to a camshaft, a cam sprocket rotating the camshaft, a rotation shaft disposed to the camshaft holder having a moving screw thread formed thereon, a first and second driven bevel gears disposed to distal ends of the rotation shaft, a screw nut engaged with the moving screw thread and moving along length direction of the rotation shaft by rotation of the first driven bevel gear or the second driven bevel gear so as to change relative phase between the camshaft and the cam sprocket and a gear control portion which selectively rotates the first driven bevel gear or the second driven bevel gear.

9 Claims, 6 Drawing Sheets

VARIABLE VALVE TIMING APPARATUS

CROSS-REFERENCE TO RELATED APPLICATION

The present application claims priority of Korean Patent Application Number 10-2010-0123453 filed in the Korean Intellectual Property Office on Dec. 6, 2010, the entire contents of which application are incorporated herein for all purposes by this reference.

BACKGROUND OF INVENTION

1. Field of Invention

The present invention relates to a continuously variable valve timing apparatus. More particularly, the present invention relates to a continuously variable valve timing apparatus which may adjust the timing of the opening and closing of valves.

2. Description of Related Art

Generally, a continuously variable valve timing apparatus (CVVT or Camshaft phaser) is a device which may adjust the timing of the opening and closing of valves.

A general continuously variable valve timing apparatus usually used in vehicles, i.e. a vane-type variable valve timing apparatus, needs relatively small volume and is economical.

The vane-type variable valve timing apparatus, however, uses lubrication oil of an engine, and thus, when oil pressure is low, rapid and accurate control cannot be expected.

Particularly, in idle state, in high temperature, in start condition and in other situations, when engine oil pressure is not sufficient, relative phase change of a camshaft cannot be obtained, and excessive exhaust gas is generated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to provide a variable valve timing apparatus having advantages of adjusting the timing of the opening and closing of valves without operational oil.

Exemplary variable valve timing apparatuses according to the present invention may include a camshaft holder connected to a camshaft, a cam sprocket rotating the camshaft, a rotation shaft disposed to the camshaft holder and having a moving screw thread formed thereto, a first and second driven bevel gear disposed to distal ends of the rotation shaft, a screw nut which is engaged with the moving screw thread and moves along length direction of the rotation shaft by rotation of the first driven bevel gear or the second driven bevel gear so as to change relative phase between the camshaft and the cam sprocket and a gear control portion which selectively rotates the first driven bevel gear or the second driven bevel gear.

A control hole may be formed to the cam sprocket, a control pin may be formed to the screw nut and the control pin may be inserted into the control hole and changes the relative phase between the camshaft and the cam sprocket by moving of the screw nut.

The second driven bevel gear may be closer to the camshaft than the first driven bevel gear is and the gear control portion may include a first driving bevel gear engaged to the first driven bevel gear, a second driving bevel gear which is engaged to the second driven bevel gear and disposed within the first driving bevel gear, and a brake which selectively brakes the first driving bevel gear or the second driving bevel gear for the first driven bevel gear or the second driven bevel gear to rotate.

The brake may include a first electromagnetic clutch which selectively brakes the first driving bevel gear and a second electromagnetic clutch which selectively brakes the second driving bevel gear.

Exemplary variable valve timing apparatuses according to the present invention may include a camshaft holder connected to a camshaft, a cam sprocket rotating the camshaft, a rotation shaft disposed to the camshaft holder and having a moving screw thread formed thereto, a first driven bevel gear disposed to one end of the rotation shaft, a second driven bevel gear which is disposes to the other end of the rotation shaft and closer to the camshaft than the first driven bevel gear is, a screw nut which is engaged with the moving screw thread and moves along length direction of the rotation shaft by rotation of the first driven bevel gear or the second driven bevel gear so as to change relative phase between the camshaft and the cam sprocket, a first driving bevel gear engaged to the first driven bevel gear, a second driving bevel gear which is engaged to the second driven bevel gear and disposed within the first driving bevel gear and a brake which selectively brakes the first driving bevel gear or the second driving bevel gear for the first driven bevel gear or the second driven bevel gear to rotate.

The brake may include a first electromagnetic clutch which selectively brakes the first driving bevel gear and a second electromagnetic clutch which selectively brakes the second driving bevel gear.

A control hole may be formed to the cam sprocket, a control pin may be formed to the screw nut and the control pin may be inserted into the control hole and change the relative phase between the camshaft and the cam sprocket by moving of the screw nut.

As described above, Exemplary continuously variable valve timing apparatuses according to the present invention may adjust the timing of the opening and closing of valves regardless operational oil pressure because the apparatus doesn't need the operational oil.

When adjustment the timing of the opening and closing of valves are not required, exemplary continuously variable valve timing apparatuses according to the present invention do not need power supplies so that engine efficiency may be enhanced.

Also, exemplary continuously variable valve timing apparatuses according to the present invention may be manufactured with simple scheme, so that manufacturing cost may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
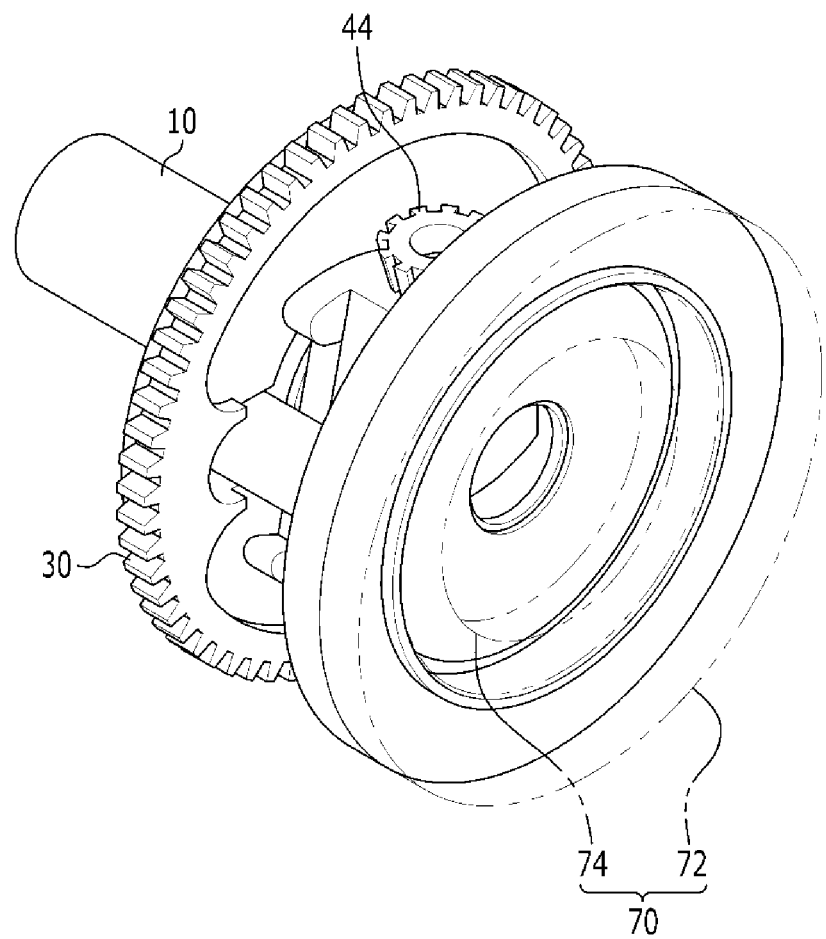
FIG. 1 is a perspective view of an exemplary variable valve timing apparatus according to the present invention.
Figure 2:
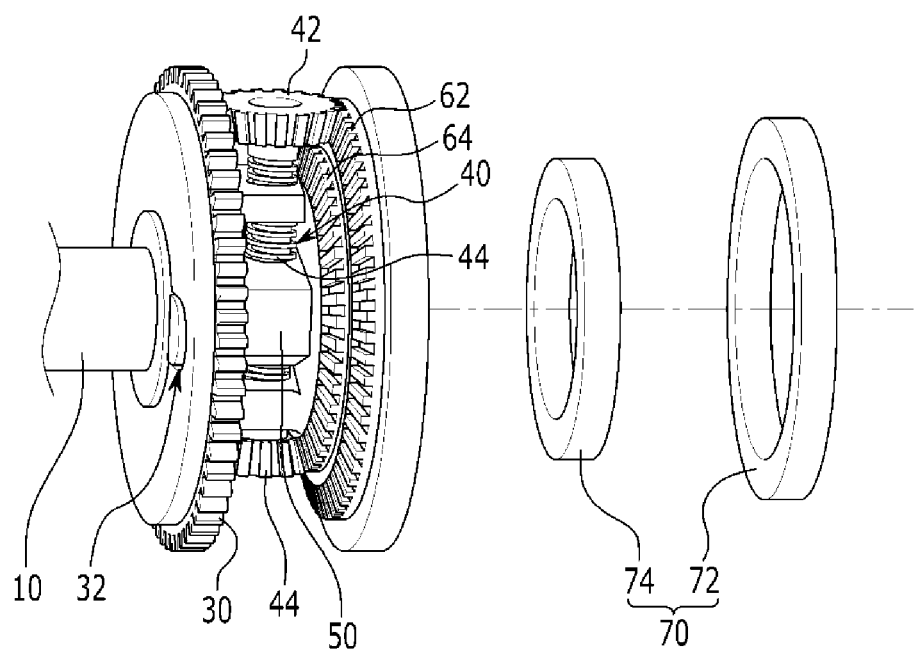
FIG. 2 is a partial exploded view of an exemplary variable valve timing apparatus according to the present invention.
Figure 3:
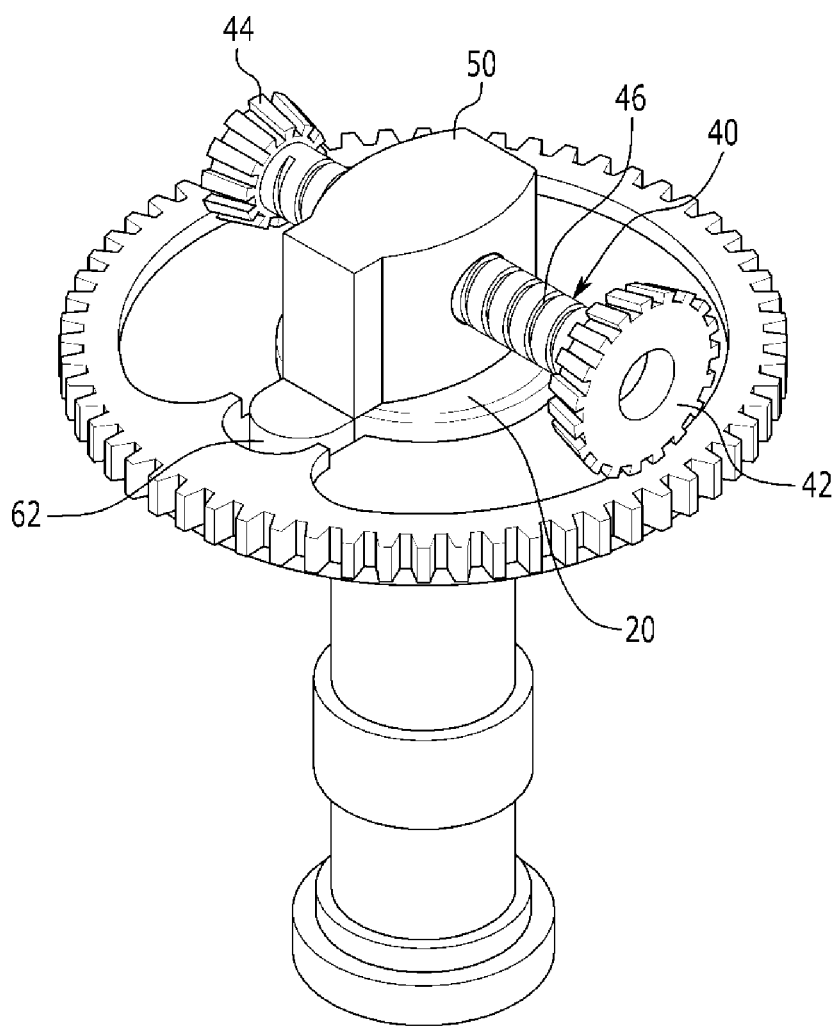
FIG. 3 is a partial perspective view of an exemplary variable valve timing apparatus according to the present invention.

Referring to FIG. 1 to FIG. 3, exemplary variable valve timing apparatuses according to the present invention may include a camshaft holder 20 connected to a camshaft 10, a cam sprocket 30 rotating the camshaft 10, a rotation shaft 40 which is disposed to the camshaft holder 20 and of which a helical structure such as a moving screw thread 46 is formed thereto, a first and second driven bevel gears 42 and 44 disposed to distal ends of the rotation shaft 40, a connecting member such as a screw nut 50 which is engaged with the helical structure or the moving screw thread 46 and moves along length direction of the rotation shaft 40 by rotation of the first driven bevel gear 42 or the second driven bevel gear 44 so as to change relative phase between the camshaft 10 and the cam sprocket 30 and a gear control portion which selectively rotates the first driven bevel gear 42 or the second driven bevel gear 44.

Figure 4:
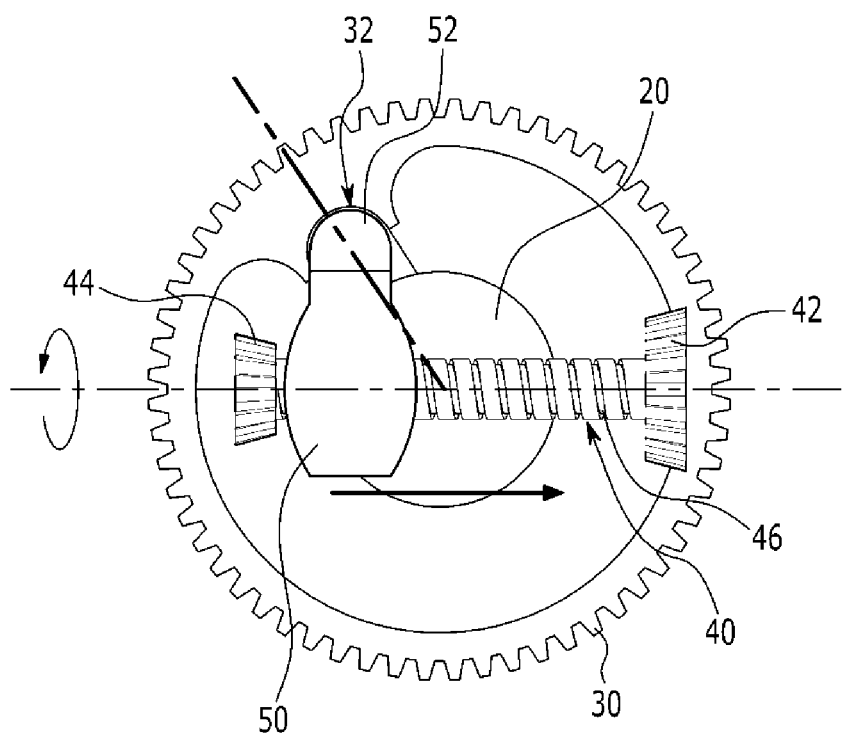
FIG. 4 shows an exemplary variable valve timing apparatus in an arbitrary initial phase according to the present invention.

Referring to FIGS. 2 and 4, a control hole 32 is formed to the cam sprocket 30, a control pin 52 is formed to the screw nut 50 and the control pin 52 is inserted into the control hole 32 and changes the relative phase between the camshaft 10 and the cam sprocket 30 by moving of the screw nut 50.

The second driven bevel gear 44 is closer to the camshaft 10 than the first driven bevel gear 42 is. And the gear control portion includes a first driving bevel gear 62 engaged to the first driven bevel gear 42, a second driving bevel gear 64 which is engaged to the second driven bevel gear 44 and disposed within the first driving bevel gear 62, and a brake 70 which selectively brakes the first driving bevel gear 62 or the second driving bevel gear 64 for the first driven bevel gear 42 or the second driven bevel gear 44 to rotate.

The brake 70 includes a first electromagnetic clutch 72 which selectively brakes the first driving bevel gear 62 and a second electromagnetic clutch 74 which selectively brakes the second driving bevel gear 64.

The first electromagnetic clutch 72 and the second electromagnetic clutch 74 are operated by control of an ECU (engine control unit; not shown) when advancing or retarding of valve opening time is required. And if control signal is selectively supplied to the first electromagnetic clutch 72 or the second electromagnetic clutch 74, the first electromagnetic clutch 72 or the second electromagnetic clutch 74 selectively brakes the first driving bevel gear 62 or the second driving bevel gear 64.

The operation of the ECU is obvious to a person skilled in the art, so detailed description will be omitted.

Referring to FIG. 1 to FIG. 6, operations of exemplary variable valve timing apparatuses according to the present invention will be described.

The cam sprocket 30 is connected to a crankshaft by a belt or a chain and rotates the camshaft 10, and the camshaft 10 of which cams are formed thereto opens an intake or an exhaust valve.

The camshaft 10, the camshaft holder 20 and the cam sprocket 30 are rotates integrally when operation change of an engine does not exist, e.g. the engine runs at a constant speed. In this case, relative phase change between the camshaft 10 and the cam sprocket 30 does not occur due to engagement of the rotation shaft 40 and the screw nut 50. That is, the cam sprocket 30 and the camshaft 10 rotate in self-lock condition.

And also, there is no relative rotation between the first driven bevel gear 42 and the first driving bevel gear 62 or the second driven bevel gear 44 and the second driving bevel gear 64.

Figure 5:
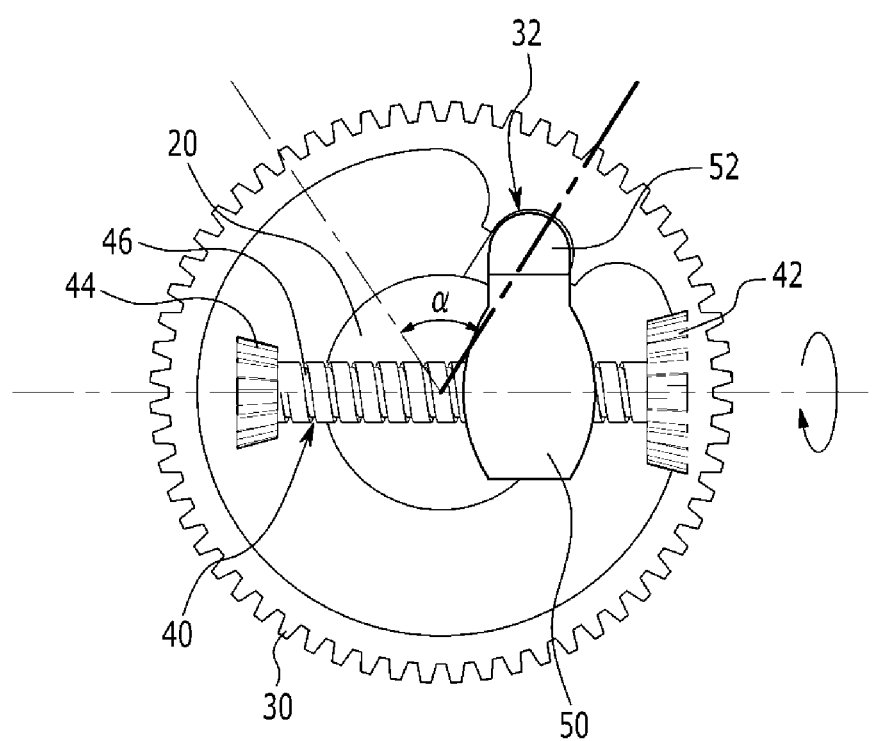
FIG. 5. shows an exemplary variable valve timing apparatus after a relative phase change according to the present invention.

When retarding or advancing of valves are required according to engine operation condition, referring to FIG. 4 and FIG. 5, electric power is supplied to the second electromagnetic clutch 74 so as to brake the second driving bevel gear 64.

And then, as shown in FIG. 4, the second driven bevel gear 44 engaged to the second driving bevel gear 64 rotates and the screw nut 50 moves to the right of the drawing along the moving screw thread 46.

And then, the relative phase between the camshaft holder 20 and the cam sprocket 30 is changed as "a" shown in FIG. 5.

That is, phase of the camshaft 10 is retarded or advanced according to rotating direction of the camshaft 10.

Figure 6:
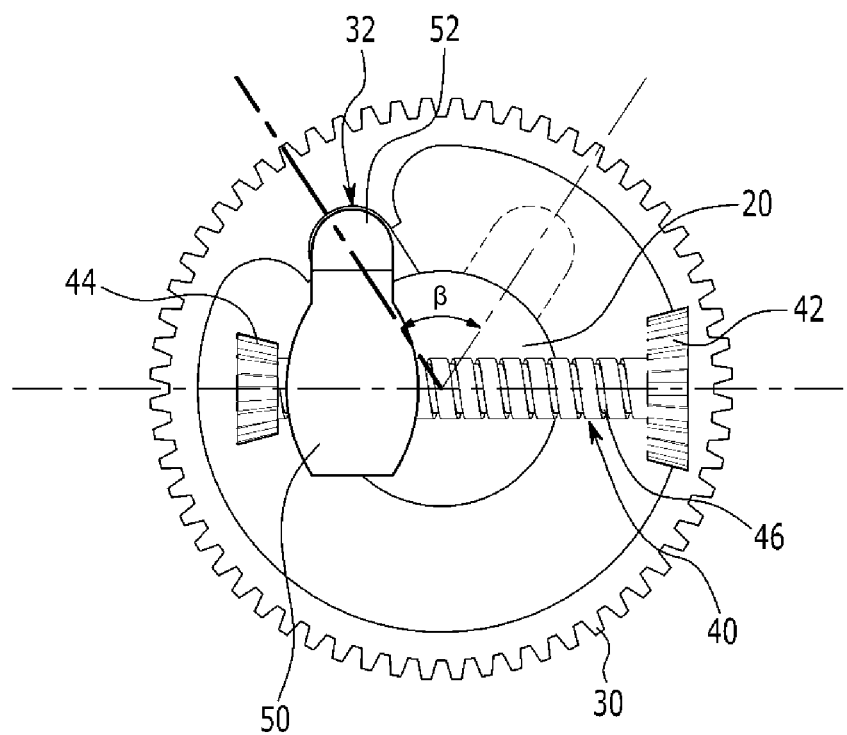
FIG. 6 shows an exemplary variable valve timing apparatus after a relative phase change in an opposite direction according to the present invention.

On the contrary, when advancing or retarding of valves are required according to engine operation condition, referring to in FIG. 5 and FIG. 6, electric power is supplied to the first electromagnetic clutch 72 so as to brake the first driving bevel gear 62.

And then, as shown in FIG. 5, the first driven bevel gear 42 engaged to the first driving bevel gear 62 rotates and the screw nut 50 moves to the left of the drawing along the moving screw thread 46.

And then, the relative phase between the camshaft holder 20 and the cam sprocket 30 is changed oppositely as "β" shown in FIG. 6.

That is, phase of the camshaft 10 is advanced or retarded according to rotating direction of the camshaft 10.

When phase change of the camshaft 10 is not required, the screw nut 50 and the moving screw thread 46 realize self-locking condition, so that additional electric power or hydraulic pressure is not required, and thus engine efficiency may be enhanced.

As described above, the continuously variable valve timing apparatus according to the exemplary embodiment of the present invention may adjust the timing of the opening and closing of valves without operational oil, and may be manufactured with simple scheme, so that manufacturing cost may be reduced, and also, self-locking may help enhance engine efficiency.

For convenience in explanation and accurate definition in the appended claims, the terms "left" or "right", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable valve timing apparatus comprising:
   a camshaft holder connected to a camshaft;
   a cam sprocket rotating the camshaft;
   a rotation shaft disposed to the camshaft holder and having a helical structure formed thereon;
   a first and second driven bevel gears disposed to distal ends of the rotation shaft;
   a connecting member engaged with the helical structure, the connecting member moving along length direction of the rotation shaft by rotation of the first driven bevel gear or the second driven bevel gear so as to change a relative phase between the camshaft and the cam sprocket; and
   a gear control portion which selectively rotates the first driven bevel gear or the second driven bevel gear.

2. The variable valve timing apparatus of claim 1, wherein the helical structure is a moving screw thread and the connecting member is a screw nut.

3. The variable valve timing apparatus of claim 2, wherein:
   a control hole is formed in the cam sprocket; and
   a control pin is formed in the screw nut,
   wherein the control pin is inserted into the control hole and changes the relative phase between the camshaft and the cam sprocket by moving of the screw nut.

4. The variable valve timing apparatus of claim 3, wherein:
   the second driven bevel gear is closer to the camshaft than the first driven bevel gear is; and
   the gear control portion comprises:
   a first driving bevel gear engaged to the first driven bevel gear;
   a second driving bevel gear engaged to the second driven bevel gear and disposed within the first driving bevel gear; and
   a brake which selectively brakes the first driving bevel gear for the first driven bevel gear to rotate or the second driving bevel gear for the second driven bevel gear to rotate.

5. The variable valve timing apparatus of claim 4, wherein the brake comprises:
   a first electromagnetic clutch which selectively brakes the first driving bevel gear; and
   a second electromagnetic clutch which selectively brakes the second driving bevel gear.

6. A variable valve timing apparatus comprising:
   a camshaft holder connected to a camshaft;
   a cam sprocket rotating the camshaft;
   a rotation shaft disposed to the camshaft holder and having a helical structure formed thereon;
   a first driven bevel gear disposed to one end of the rotation shaft;
   a second driven bevel gear disposed to the other end of the rotation shaft and closer to the camshaft than the first driven bevel gear is;
   a connecting member engaged with the helical structure, the connecting member moving along length direction of the rotation shaft by rotation of the first driven bevel gear or the second driven bevel gear so as to change a relative phase between the camshaft and the cam sprocket;
   a first driving bevel gear engaged to the first driven bevel gear;
   a second driving bevel gear engaged to the second driven bevel gear and disposed within the first driving bevel gear; and
   a brake which selectively brakes the first driving bevel gear for the first driven bevel gear to rotate or the second driving bevel gear for the second driven bevel gear to rotate.

7. The variable valve timing apparatus of claim 6, wherein the helical structure is a moving screw thread and the connecting member is a screw nut.

8. The variable valve timing apparatus of claim 7, wherein the brake comprises:
   a first electromagnetic clutch which selectively brakes the first driving bevel gear; and
   a second electromagnetic clutch which selectively brakes the second driving bevel gear.

9. The variable valve timing apparatus of claim 8, wherein:
   a control hole is formed in the cam sprocket; and
   a control pin is formed in the screw nut,
   wherein the control pin is inserted into the control hole and changes the relative phase between the camshaft and the cam sprocket by moving of the screw nut.

* * * * *